(12) United States Patent
Ancimer et al.

(10) Patent No.: US 7,463,967 B2
(45) Date of Patent: Dec. 9, 2008

(54) DIRECT INJECTION GASEOUS-FUELLED ENGINE AND METHOD OF CONTROLLING FUEL INJECTION PRESSURE

(75) Inventors: Richard Ancimer, Vancouver (CA); Greg Batenburg, North Delta (CA); Jeff Thompson, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/941,887

(22) Filed: Nov. 16, 2007

(65) Prior Publication Data

US 2008/0103676 A1     May 1, 2008

Related U.S. Application Data

(63) Continuation of application No. PCT/CA2006/000828, filed on May 18, 2006.

(51) Int. Cl.
   F02M 51/00    (2006.01)
   F02B 43/00    (2006.01)
   G06F 19/00    (2006.01)
(52) U.S. Cl. ............... 701/104; 701/115; 123/527; 123/480
(58) Field of Classification Search ......... 123/295, 123/299, 300, 305, 478, 480, 486, 525–529, 123/27 GE; 701/101–105, 115
See application file for complete search history.

(56) References Cited

U.S. PATENT DOCUMENTS

| | | | |
|---|---|---|---|
| 3,989,060 A | 11/1976 | Hughes | |
| 4,186,707 A | 2/1980 | Driggers | |
| 4,469,073 A | 9/1984 | Kobayashi et al. | |
| 4,497,300 A * | 2/1985 | Maruyama et al. | 123/478 |
| 5,067,467 A | 11/1991 | Hill et al. | |
| 5,183,019 A | 2/1993 | Suhara | |
| 5,261,366 A * | 11/1993 | Regueiro | 123/478 |
| 5,313,924 A | 5/1994 | Regueiro | |
| 5,408,957 A | 4/1995 | Crowley | |
| 5,477,829 A | 12/1995 | Hassinger et al. | |
| 5,752,490 A | 5/1998 | Rodgers et al. | |
| 5,839,420 A | 11/1998 | Thomas | |
| 6,151,547 A * | 11/2000 | Kumar et al. | 701/104 |
| 6,332,448 B1 | 12/2001 | Ilyama et al. | |
| 6,748,919 B2 * | 6/2004 | Abo et al. | 123/299 |
| 7,089,916 B2 * | 8/2006 | Abo et al. | 123/299 |

FOREIGN PATENT DOCUMENTS

| | | |
|---|---|---|
| EP | 0105793 | 11/1987 |
| EP | 1519031 A1 | 4/2005 |
| GB | 2330178 A | 4/1998 |

* cited by examiner

Primary Examiner—Willis R Wolfe, Jr.
(74) Attorney, Agent, or Firm—McAndrews, Held & Malloy, Ltd.

(57) ABSTRACT

An engine operating method and a direct injection gaseous fuelled system directly injects a gaseous fuel into a combustion chamber during a compression stroke, commands gaseous fuel injection pressure to a target value that is determined as a function of at least one pre-selected engine parameter, measures actual gaseous fuel injection pressure and adjusts fuel injection pulsewidth to correct for differences between the target value and the actual gaseous fuel injection pressure to thereby inject the desired mass quantity of gaseous fuel as determined from an engine map.

48 Claims, 5 Drawing Sheets

DIRECT INJECTION GASEOUS-FUELLED ENGINE AND METHOD OF CONTROLLING FUEL INJECTION PRESSURE

CROSS-REFERENCE TO RELATED APPLICATION(S)

This application is a continuation of International Application No. PCT/CA2006/000828, having an international filing date of May 18, 2006, entitled "Direct Injection Gaseous-Fuelled Engine and Method of Controlling Fuel Injection Pressure". International Application No. PCT/CA2006/000828 claimed priority benefits, in turn, from Canadian Patent Application No. 2,505,455 filed May 18, 2005, and U.S. Provisional Patent Application Ser. No. 60/682,629, also filed May 18, 2005. International Application No. PCT/CA2006/000828 is hereby incorporated by reference herein in its entirety.

FIELD OF THE INVENTION

The present invention relates to an engine with gaseous fuel introduced by direct injection into the combustion chamber(s) and an operating method for controlling gaseous fuel injection pressure responsive to predetermined operating conditions for such an engine.

BACKGROUND OF THE INVENTION

So-called compression ignition engines employ compression ratios that are much higher than Otto cycle (spark-ignited) engines. Characteristics of compression ignition engines such as direct injection, higher compression ratios and unthrottled air intake systems permit more efficient fuel combustion, higher performance, and lower fuel consumption on an energy basis, compared to spark-ignited engines. The most common compression ignition engines are diesel engines. However, in many countries, to comply in the future with already announced government regulatory standards, diesel engine manufacturers will be required to make improvements to engines being sold today in order to lower engine emissions of combustion products such as NOx and particulate matter. Such improvements are expected to require additional equipment and more sophisticated electronic engine controls to implement technology such as exhaust gas recirculation, new combustion strategies, and aftertreatment. Some of these technologies could reduce the efficiency compared to present day engines, and could require the use of low-sulfur fuel, which is more expensive to produce, adding to both future operating and capital costs.

Gaseous fuels such as natural gas, pure methane, ethane, liquefied petroleum gas, lighter flammable hydrocarbon derivatives, hydrogen, and blends of such fuels can be employed as substitutes for diesel fuel by modifying conventional diesel engines. Gaseous fuels are generally defined herein as fuels that are gaseous at atmospheric pressure and zero degrees Celsius. Whereas liquid fuels such as diesel are injected at very high pressures in order to atomize the fuel, gaseous fuels can be injected into an engine's combustion chamber at lower pressures because no extra energy is required for fuel atomization.

An advantage of substituting a gaseous fuel for diesel fuel is that a gaseous fuel can be selected that burns cleaner than diesel fuels, so that the present day desirable characteristics of diesel engines, namely high efficiency and high torque, can be preserved without requiring as much engine emission reduction technology.

Another advantage of gaseous fuels is that, as a resource, such fuels are more widely distributed around the world and the amount of proven reserves of natural gas is much greater, compared to proven oil reserves. In many markets around the world, natural gas is less expensive compared to diesel fuel on an energy equivalent basis.

Gaseous fuels can also come from renewable sources such as vent gases from garbage dumps and sewage treatment plants. Hydrogen can be produced with electricity generated from renewable sources such as wind power and hydro-electric dams.

However, some modifications are required to a conventional diesel engine to allow gaseous fuels to be substituted for diesel fuel. In a diesel engine, the heat produced by the mechanical compression of the fuel and air mixture auto-ignites the liquid diesel fuel charge at or near the end of the piston's compression stroke. Under the same conditions, gaseous fuels such as natural gas will not reliably auto-ignite. Accordingly, without re-designing engines to provide the conditions necessary to auto-ignite a gaseous fuel, in order to burn a gaseous fuel in a conventional engine with the same compression ratio, some additional device is required to assist with ignition of the gaseous fuel, such as a hot surface provided by a glow plug, or a fuel injection valve for introducing a pilot fuel. The pilot fuel can be a small quantity of diesel fuel, whereby the auto-ignition of the pilot fuel triggers the ignition of the gaseous fuel.

Figure 1:
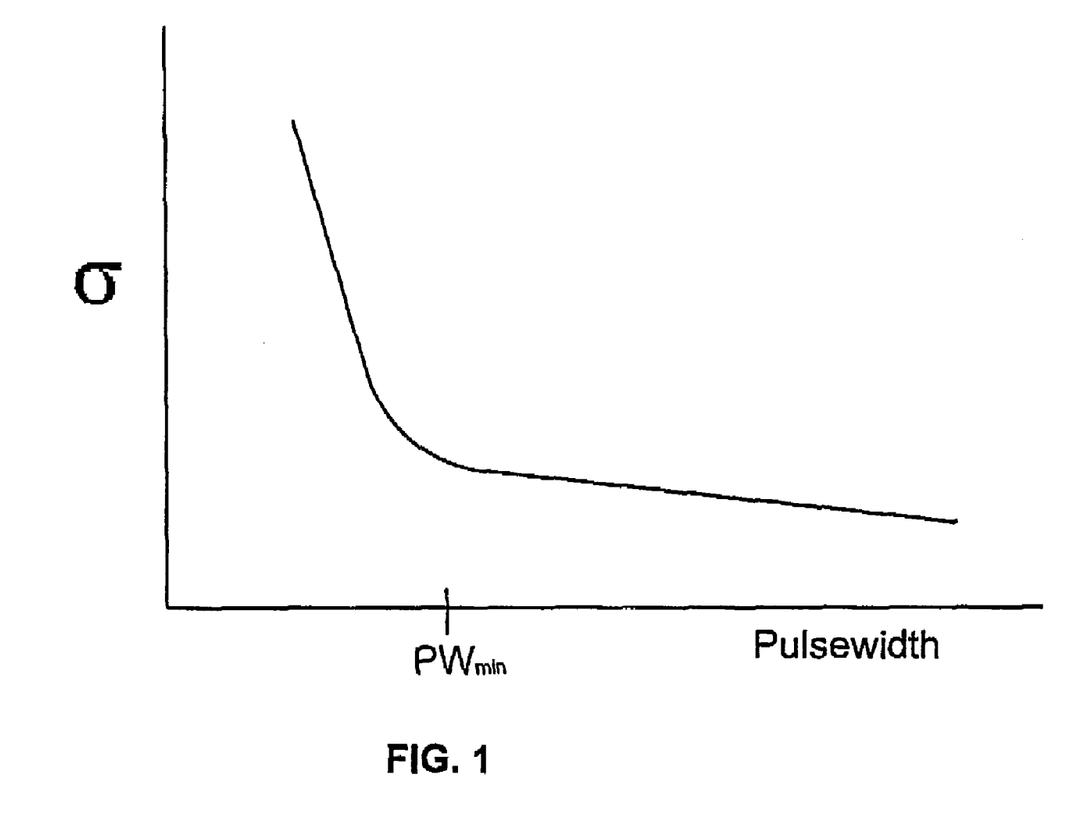
FIG. 1 is a graph that plots the standard deviation (s) of actual delivered fuel quantity versus pulsewidth for a gaseous fuel injection valve.

One of the problems with direct injection of gaseous fuels into a combustion chamber of an internal combustion engine is that there can be some variation in the amount of fuel injected from one injection event to the next. This is because in a gaseous-fuelled engine there are number of variables that can influence the amount of fuel that is injected. Some of these variables are not a factor for conventional diesel-fuelled engines or if it is, it is a factor to a different degree. For example, the in-cylinder pressure may vary slightly from cycle to cycle, and because it is desirable to maintain gaseous fuel injection pressure lower than the conventional diesel fuel injection pressure, the variations in in-cylinder pressure can have a larger effect on fuel mass flow rate. Also because of the lower mass density of gaseous fuels, the valve needle for a gaseous fuel injection valve can have a larger end surface area than a diesel fuel injection valve, whereby in-cylinder pressure can have a larger effect on the movement of the needle of a gaseous fuel injection valve. Variations in fuel temperature can also affect the mass density of gaseous fuels, introducing a variable that can cause variations in the amount of fuel that is introduced from one injection event to the next. FIG. 1 is a graph of the standard deviation of the actual delivered quantity of fuel against the duration of an injection event for an injection valve for gaseous fuels. The duration of an injection event is also referred to herein as "pulsewidth". This graph shows that variability in the amount of fuel injected generally increases as pulsewidth decreases, with variability rising sharply once pulsewidth drops below a certain point. The actual values for axes on this graph are not shown, nor are they important since the actual values may be different for different engine systems and valve designs. However, the effect is significant and believed to be universal. Variability in the amount of fuel that is injected can cause inefficiencies, and if severe, such variability can cause unstable combustion. Accordingly, for gaseous-fuelled engines there is a need for an operating method that reduces variability in the amount of fuel that is injected.

Another problem encountered by gaseous-fuelled engines is that because gaseous fuels have a lower mass density, if injection pressure is kept constant, it can require lengthening the pulsewidth under high load conditions to inject the desired amount of fuel. Under high load conditions, with gaseous fuel it can reduce engine efficiency if the pulsewidth is too long.

Furthermore, if an engine employs exhaust gas circulation (EGR), which is a known technique for reducing emissions of NOx, one of the effects of high EGR rates is that it slows the rate of combustion. A benefit of using gaseous fuels with EGR is that the combustion of gaseous fuels produces less particulate matter and this means that less particulate matter is returned to the combustion chamber with the recirculated exhaust gas, allowing higher EGR rates. For the purposes of this disclosure, "high" amounts of EGR are considered to by EGR rates higher than 15%, and with a gaseous-fuelled engine it is possible to employ even higher EGR rates in the range of 30% to 40% under high load conditions. Accordingly, there is a need to modify gaseous fuel injection strategy to compensate for the slower combustion rate caused by high EGR rates and the lower mass density of gaseous fuels, especially when the engine is operating at high load and high speed, when a longer fuel injection pulsewidth can be particularly problematic.

While it has been demonstrated that by injecting a gaseous fuel directly into the combustion chamber of an internal combustion engine, it is possible to at least match the power output, performance, and efficiency of a conventional diesel engine, there are a number of factors that make gaseous-fuelled engines different from conventional diesel-fuelled engines, and these differences require operating methods that are different from those developed for conventional diesel engines.

SUMMARY OF THE INVENTION

An operating method for an internal combustion engine is provided that comprises:
 delivering a gaseous fuel to a fuel injection valve, wherein gaseous fuel pressure within the fuel injection valve is defined as gaseous fuel injection pressure;
 during an engine's compression stroke, injecting the gaseous fuel directly into the combustion chamber through the fuel injection valve;
 determining a value for at least one pre-selected engine parameter from engine operating conditions and commanding gaseous fuel injection pressure to a predetermined target value that is associated with the determined value of the at least one preselected engine parameter; and
 measuring gaseous fuel injection pressure and adjusting fuel injection pulsewidth to correct for differences between the predetermined target values and measured gaseous fuel injection pressure to thereby inject the desired mass quantity of gaseous fuel as determined from an engine map.

At least one of the pre-selected engine parameters can be engine state, engine load, engine speed, fuel rail temperature, or in-cylinder pressure. An engine can be operated in a number of engine states, and a target value of the fuel injection pressure can be associated with each one of the engine states, or for a set of engine states. For example, a predetermined low pressure can be defined as the target value when the engine is operating in an idle or auxiliary load state, and a predetermined normal pressure, higher than the predetermined low pressure, can be defined as the target value for the fuel injection pressure when the engine is cranking, or in a primary load state or when the primary load state passes a low load threshold.

The operating method preferably further comprises maintaining a ratio of gaseous fuel injection pressure to in-cylinder pressure that is high enough to result in a fuel jet exiting from the fuel injection valve comprising at least some gaseous fuel with a velocity exceeding sonic velocity within the combustion chamber. The desired pressure ratio is one factor that should be considered when deciding the value for the low pressure target value.

According to the disclosed method, when gaseous fuel injection pressure is commanded to decrease, the controller restricts the rate of reducing the pressure so that gaseous fuel injection pressure can be decreased without venting the gaseous fuel to atmosphere. For the disclosed gaseous-fuelled engine, the rate of decreasing gaseous fuel injection pressure is a function of the rate at which the gaseous fuel is consumed by the engine. This is because it is not practical to recirculate any of the high-pressure gas back to the storage vessel. In a cryogenic system, this would introduce too much heat to the liquefied fuel. In a compressed gas system, there may be times when the storage pressure is higher than the injection pressure.

The method can decrease gaseous fuel injection pressure using a negative rate limiter. In a preferred embodiment, the negative rate limiter is operative using closed loop control to decrease gaseous fuel injection pressure by predetermined increments until a target pressure is attained. Even more preferably, the predetermined increments can be selected based on measured gaseous fuel consumption rates, so that the rate of pressure decrease is responsive to the ability of the gaseous fuel injection pressure to be reduced without venting any gaseous fuel to atmosphere. The negative rate limiter can comprise a negative rate limiting algorithm programmable into an electronic engine controller or a dedicated electronic circuit.

The method of decreasing gaseous fuel injection pressure preferably comprises stopping delivery of the gaseous fuel to a fuel rail that feeds the fuel injection valve until gaseous fuel injection pressure drops to a desired one of the predetermined values. Delivery of gaseous fuel to the fuel rail can be stopped by closing a valve associated with a fuel supply line. Alternatively, supply of gaseous fuel to the fuel rail can be slowed by modulation of a pressure control valve or by shutting down a compressor or pump that is employed to supply the gaseous fuel to the fuel injection valve.

In one embodiment the method comprises commanding the gaseous fuel injection pressure to one of a plurality of discrete predefined pressures responsive to measured engine parameter values, the engine parameters comprising at least one of engine state, engine load, engine speed, fuel rail temperature, and in-cylinder pressure. One of the predefined injection pressures can be P(low), which is lower than a second predefined injection pressure P(normal). The method can comprise commanding gaseous fuel injection pressure to P(low) when the engine is operating in an idling condition or at a point on an engine map that is below a predefined low load threshold, and commanding the gaseous fuel injection pressure to P(normal) when a load is applied to the engine or when the engine is operating at a point on an engine map that his above the predefined low load threshold. The method can further comprise a third predefined injection pressure P(high), which is higher than P(normal). With this third predefined injection pressure P(high), the method can further comprise commanding gaseous fuel injection pressure to P(high) when the engine is operating at a point on the engine map above a predetermined high load threshold. Pressure P(low) is preferably a pressure at which a desired amount of gaseous fuel can be injected into the combustion chamber through the fuel injection valve with a fuel injection pulsewidth greater than or equal to a predetermined minimum pulsewidth when the engine is operating in an idling condition.

The operating method can further comprise re-circulating a portion of exhaust gases from one engine cycle to return to the combustion chamber for a subsequent engine cycle. In a preferred embodiment, when the engine is operating at a point on the engine map above the predetermined high load threshold, recirculated exhaust gas can make up at least 15% by mass of the gases introduced into the combustion chamber during an intake stroke.

In another preferred embodiment, the method further comprises injecting a pilot fuel into the combustion chamber to trigger ignition of the gaseous fuel. In such embodiments, to reduce the modifications required to a conventional engine's cylinder head, a single fuel injection valve can be operable to introduce both the pilot fuel and the gaseous fuel into the combustion chamber. With pilot fuel and gaseous fuel fluidly isolated from each other in the fuel injection valve to allow separate and independent injection of the two fuels into the combustion chamber, it is preferable to regulate gaseous fuel pressure and pilot fuel pressure to reduce a pressure differential between the gaseous fuel and the pilot fuel before each of the fuels is delivered to the fuel injection valve. Gaseous fuel pressure is preferably negatively biased with respect to pilot fuel pressure, to prevent gaseous fuel from leaking into the pilot fuel or into liquid seals charged with liquid pilot fuel.

The method of regulating gaseous fuel injection pressure can comprise commanding gaseous fuel injection pressure to predetermined target pressures for predetermined operating points on the engine map, and calculating target pressures for operating points between the predetermined operating points by interpolation.

The disclosed operating method can further comprise defining the fuel injection pulsewidth for predetermined operating points on the engine map, and calculating fuel injection pulsewidth for operating points between the predetermined operating points by interpolation. The method can further comprise maintaining a fuel injection pulsewidth that is no less than a predetermined minimum pulsewidth for all operating points on an engine map.

An internal combustion engine system is disclosed that comprises components that cooperate with each other to introduce a gaseous fuel into a combustion chamber where it can be combusted. The disclosed internal combustion engine system comprises:

(a) a fuel delivery subsystem comprising a device for controlling gaseous fuel pressure and a fuel rail for delivering the gaseous fuel;
(b) a fuel injection valve operatively connected to the fuel rail whereby the gaseous fuel at a commanded gaseous fuel injection pressure can be directed from the fuel supply subsystem to the fuel injection valve and introduced into the combustion chamber through a fuel injection valve nozzle that is disposed in the combustion chamber;
(c) a controller operative to:
  (i) determine a value for at least one pre-selected engine parameter from engine operating conditions;
  (ii) determine a target value for gaseous fuel injection pressure that is associated with the determined value of the at least one pre-selected engine parameter;
  (iii) command the device for controlling gaseous fuel injection pressure to increase, or decrease gaseous fuel pressure to the target value if gaseous fuel injection pressure is not equal to the target value; and
  (iv) command opening and closing of the fuel injection valve to adjust fuel injection pulsewidth to correct for differences between measured gaseous fuel injection pressure and the predetermined target value.

In preferred embodiments, one of the pre-selected engine parameters is in-cylinder pressure, and the predetermined target values are selected to maintain a ratio of gaseous fuel injection pressure to in-cylinder pressure that is high enough to result in a fuel jet exiting from the fuel injection valve comprising at least some gaseous fuel with a velocity exceeding sonic velocity within the combustion chamber.

The internal combustion engine system preferably comprises a negative rate limiter associated with the device for controlling gaseous fuel pressure. The negative rate limiter acts to restrict the rate of decreasing gaseous fuel pressure to prevent venting of the gaseous fuel to atmosphere. The controller is preferably an electronic controller and the negative rate limiter can comprise an algorithm programmable into the controller or a dedicated electronic circuit.

In preferred embodiments, device for controlling gaseous fuel pressure is a pressure regulating valve associated with the fuel rail. In an engine that employs a pilot fuel, a metering valve associated with a pilot fuel delivery subsystem can be employed to control pilot fuel pressure and gaseous fuel injection pressure is controlled responsive to pilot fuel pressure through the operation of the pressure regulating valve. That is, the controller can command the pressure regulating valve to close to allow gaseous fuel injection pressure to decrease as gaseous fuel within the fuel rail between the pressure regulating valve and the fuel injection valve is consumed by the engine, or in the case of an engine which uses a pilot fuel, the controller can indirectly control the pressure regulating valve by controlling a pilot fuel injection pressure, for example by controlling a pilot fuel metering valve.

The fuel delivery subsystem comprises a pump or compressor that can be employed for delivering high-pressure gaseous fuel to the fuel injection valves. In some embodiments, the controller can be programmed to command the pump or compressor to stop to allow gaseous fuel injection pressure to decrease as gaseous fuel within the fuel rail between the pump or compressor and the fuel injection valve is consumed by the engine.

In preferred embodiments, the internal combustion engine system can further comprise an exhaust gas recirculation apparatus for directing an exhaust gas stream, which originates from the combustion chamber, back into the combustion chamber, and an EGR valve for regulating the amount of exhaust gas that is recirculated.

In a preferred embodiment of the internal combustion engine system, the device for controlling gaseous fuel pressure is also operative to maintain a pressure differential between the gaseous fuel and the pilot fuel within a predetermined range. The device for controlling gaseous fuel pressure can comprise a dome-loaded regulator that has a control chamber is in communication with the pilot fuel rail.

In the disclosed engine system, a pressure sensor is associated with the fuel injection valve or the fuel rail between the device for controlling gaseous fuel pressure and the fuel injection valve, for measuring gaseous fuel pressure. In an engine that uses a pilot fuel that has its injection pressure balanced with the gaseous fuel injection pressure, instead of a gaseous fuel pressure sensor, or in addition to it, the engine system can employ a pressure sensor associated with the pilot fuel rail. A pressure sensor is needed to measure actual injection pressure so that fuel injection pulsewidth can be adjusted to compensate for differences between the actual fuel injection pressure and the target value for the injection pressure.

The internal combustion engine system can further comprise a sensor for measuring in-cylinder pressure directly or for measuring an operating parameter associated with the engine from which in-cylinder pressure can be determined indirectly.

Accordingly, with the disclosed method and apparatus for controlling fuel injection pressure in a gaseous-fuelled engine with direct fuel injection, it is possible to improve combustion characteristics, improve fuel efficiency, and reduce engine emissions of NOx.

DETAILED DESCRIPTION OF PREFERRED EMBODIMENT(S)

Figure 2:
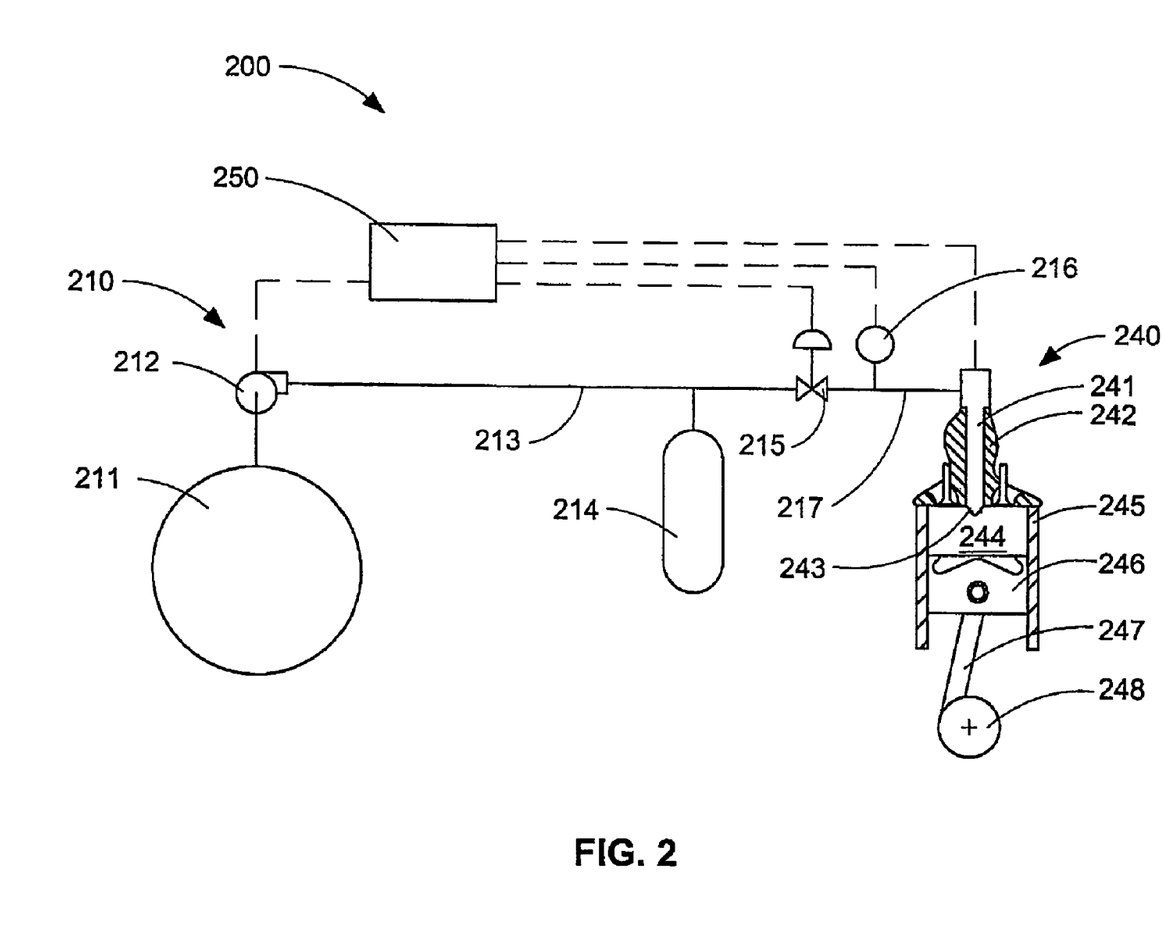
FIG. 2 is a schematic view of a gaseous-fuelled internal combustion engine system for controlling gaseous fuel injection pressure by determining pre-selected engine parameters from engine operating conditions, and increasing or decreasing fuel injection pressure to a predetermined target value that is associated with the determined value of the pre-selected engine parameters.
Figure 3:
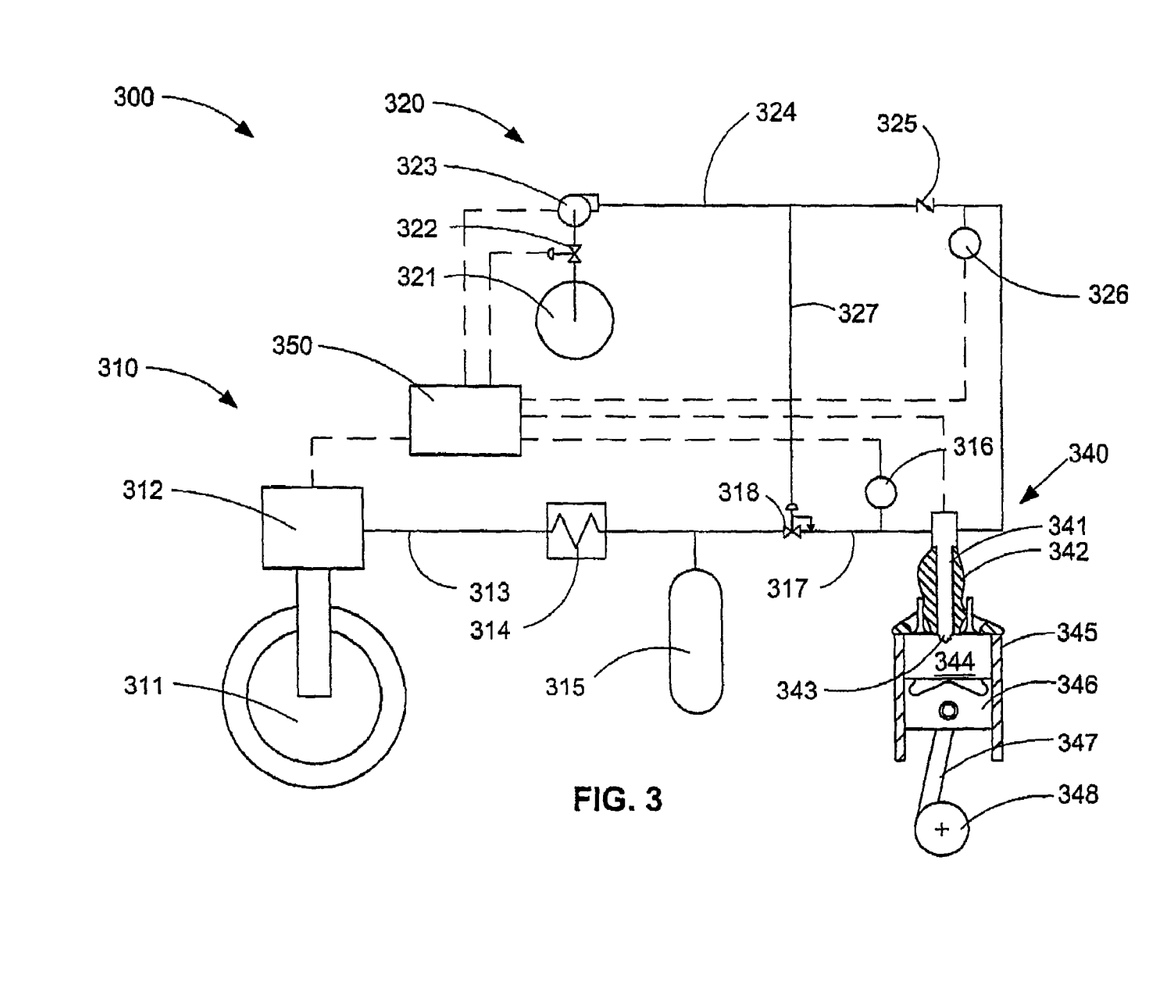
FIG. 3 is a schematic view of a gaseous-fuelled internal combustion engine system that can employ the same method as the engine system of FIG. 2, but that has the additional feature of balancing gaseous fuel pressure with the pressure of a pilot fuel that is employed for assisting with ignition of the gaseous fuel. In this arrangement, the pilot fuel and gaseous fuel are introduced into the combustion chamber by a dual fuel injection valve, which allows the separate and independent injection of the pilot and gaseous fuels.

FIGS. 2 and 3 show schematic views of two arrangements for a gaseous-fuelled internal combustion engine system.

Referring to FIG. 2, internal combustion engine system 200 illustrates an embodiment that stores the gaseous fuel as compressed gas. Internal combustion engine system 200 generally comprises fuel delivery subsystem 210, fuel injection subsystem 240, and engine controller 250. Each of these subsystems is described in more detail below as well as a description of the manner in which they cooperate with each other to introduce a gaseous fuel into a combustion chamber where it can be combusted.

Because gaseous fuels typically do not auto-ignite at the same temperature and pressure as conventional liquid fuels such as diesel fuel, to preserve the general configuration of conventional diesel engines, including the compression ratio, an ignition assist device can be provided to assist with ignition of gaseous fuels. For example, an ignition assist device can be a pilot fuel injection valve for injecting an auto-ignitable pilot fuel to trigger the ignition of the gaseous fuel, or a hot surface provided by an ignition plug such as continuously operable glow plug. In the embodiment of FIG. 2, fuel delivery subsystem 210 delivers only gaseous fuel to the engine, so the ignition assist device can comprise a separate pilot fuel delivery system or an ignition plug (not shown).

Fuel delivery subsystem 210 comprises storage tank 211, compressor 212, fuel supply line 213, accumulator vessel 214, pressure regulator valve 215, pressure sensor 216 and fuel rail 217. Storage tank 211 is a pressure-rated vessel for storing the gaseous fuel under pressure. Gaseous fuels are typically stored at high pressures to increase fuel density so that less space is required to store the fuel on-board a vehicle. Different jurisdictions may have different regulations regarding the maximum storage pressure that is permitted, so the jurisdiction where the engine will be deployed may restrict the maximum allowable fuel storage pressure. A maximum fuel storage pressure between 3000 psi and 5000 psi is practical with currently available technology. There are no known technical barriers to employing still higher pressures, although economic factors should also be considered. For example, there may be economic disadvantages associated with the extra weight of a pressure vessel rated for a higher maximum pressure, the manufacturing costs and the cost of carrying a heavier storage vessel on board of vehicle could have an effect on economic feasibility that overrides the economic value gained by the extra fuel storage capacity for gases stored at higher pressures.

Pressure regulator valve 215 is preferably electronically controllable by controller 250 to reduce fuel injection pressure in fuel rail 217 by restricting fuel flow through regulator valve 215 and causing a larger pressure drop across regulator valve 215, or if a large decrease in fuel injection pressure is required, by closing pressure regulator valve 215 completely, whereby consumption of gaseous fuel in fuel rail 217 by the engine causes fuel injection pressure to decay. Conversely, if an increase in fuel injection pressure is needed, controller 250 can control pressure regulator valve 215 to a fully open position, and command compressor 212 to start, if in a rest mode, or to operate at a higher speed, in the case of a compressor with a variable speed drive.

Fuel injection subsystem 240 comprises fuel injection valve 241, which is mounted in cylinder head 242. Fuel injection valve 241 comprises nozzle 243, which comprises a tip that is disposed within combustion chamber 244, through which gaseous fuel can be directly injected into combustion chamber 244. Combustion chamber 244 is defined by cylinder head 242, cylinder 245 and piston 246. Cylinder head 242 covers the top end of cylinder 245, opposite to piston 246, which is reciprocable within cylinder 245 to define the lower boundary of combustion chamber 244. Piston rod 248 connects piston 246 to crankshaft 248.

Controller 250 is programmable to send command signals to compressor 212, pressure regulator 215 and fuel injection valve 241. Command signals sent to compressor 212 and pressure regulator 215 can be employed to increase or decrease gaseous fuel injection pressure. Command signals sent to fuel injection valve 214 can be employed to open and close the fuel injection valve, the timing of these events determining pulsewidth. In addition, if fuel injection valve 241 has partial lift and lift control capability, the command signal from controller 250 can dictate the degree of lift (the linear displacement of the valve member that is displaceable to open and close the valve) in addition to signaling how quickly the valve is opened and closed.

Engine controller 250 receives data relating to engine operating conditions from internal combustion engine system 200. From this data, controller determines a value for at least one pre-selected engine parameter. According to the control method, one or more engine parameters are pre-selected and the control strategy for increasing or decreasing gaseous fuel pressure is based upon the value of the preselected parameter(s). The pre-selected engine parameters can include engine state, engine load, engine speed, fuel temperature in fuel supply line 213 and/or fuel rail 217, and in-cylinder pressure. According to the engine set up, the value of one or more of these parameters is determined and based on such values, controller 250 commands gaseous fuel injection pressure to be increased or decreased to a predetermine target value that is associated with the determined value of the one or more pre-selected parameters.

For example, a fuel pressure control strategy based on engine states, can assign a first target fuel injection pressure when the engine is operating in an idle state or power take off state, where the engine is providing a relatively small amount of power to an auxiliary device. When the engine is operating in any other engine state, a second target fuel injection pressure can be assigned where the second target fuel injection pressure is higher than the first target fuel injection pressure.

Controller 250 also receives a signal from pressure sensor 216, indicating the gaseous fuel pressure in fuel rail 217. A characteristic of the disclosed method is that fuel injection pressure can be raised very rapidly, but that when fuel injection pressure is commanded to decrease, the actual fuel injection pressure may be different from the target injection pressure until pressure decays as a result of fuel consumption of operating of pressure regulator valve 215. Accordingly, controller 250 uses the pressure signal from pressure sensor 216 to detect actual fuel rail pressure, and make adjustments to the fuel injection pulsewidth to correct for the difference between the measured fuel rail pressure and the target injection pressure so that the desired mass quantity of gaseous fuel that is determined from an engine map is the quantity that is actually injected.

Referring to FIG. 3, internal combustion engine system 300 illustrates an embodiment that stores the gaseous fuel as a liquefied gas and that introduces gaseous fuel and a pilot fuel into a combustion chamber through a common fuel injection valve assembly 340, to be described in more detail below.

Internal combustion engine system 300 generally comprises fuel delivery subsystem 310, pilot fuel delivery subsystem 320, fuel injection subsystem 340, and engine controller 350. Each of these subsystems is described in more detail below together with a description of the manner in which they cooperate with each other to introduce a gaseous fuel into a combustion chamber where it can be combusted.

Gaseous fuel delivery subsystem 310 comprises storage tank 311, pump 312, fuel supply line 313, vaporizer 314, accumulator vessel 315, pressure sensor 316, fuel rail 317, and pressure regulating valve 318. Gaseous fuels such as natural gas and hydrogen can be stored in liquefied form at cryogenic temperatures. Thermally insulated vessels for storing liquefied gases at cryogenic temperatures are well known. Accordingly, storage tank 311 can be a double-walled vacuum insulated vessel designed for vehicular use. As shown in FIG. 3, pump 312 can have a suction inlet disposed inside the cryogen space of storage tank 311. In a preferred embodiment, pump 312 can be immersed in the cryogen space, with a drive shaft extending therefrom and connected to a drive unit disposed outside the cryogen space.

Pilot fuel delivery subsystem 320 comprises storage tank 321, metering valve 322, pump 323, pilot fuel rail 324, check valve 325, pressure sensor 326, and pilot fuel line 327. In the illustrated embodiment, metering valve 322 controls pilot fuel pressure in pilot fuel rail 324 by controlling the quantity of pilot fuel that is delivered to pump 323, which in a preferred embodiment is a piston pump that is operative with variable fuel flow. Pilot fuel line 327 dead-ends at the control chamber of pressure regulating valve 318. Accordingly, pilot fuel in pilot fuel line 327 is static, but pilot fuel pressure is communicated to pressure regulating valve 318 through pilot fuel line 327. Pilot fuel pressure in the control chamber of pressure regulating valve 318 operates a valve member in pressure regulating valve 318 to an open or closed position to balance gaseous fuel pressure in gaseous fuel rail 317 with pilot fuel pressure in pilot fuel rail 324. A spring in the control chamber can be employed to give gaseous fuel pressure a negative bias to prevent gaseous fuel from leaking into the pilot fuel. With this arrangement, gaseous fuel pressure is controlled through pilot fuel pressure. When fuel injection pressure is commanded to decrease, the controller limits the rate at which pilot fuel pressure is decreased to a rate that can be matched by decreasing gaseous fuel pressure, achieved by closing pressure regulating valve 318 and allowing gaseous fuel in fuel rail 317 to be consumed to thereby cause gaseous fuel injection pressure to decrease. Accordingly, in preferred embodiments, controller 350 detects the engine's rate of gaseous fuel consumption and commands pilot fuel metering valve 322 to decrease pilot fuel pressure at the same rate.

Pressure regulating valve 318 can be, for example, a dome-loaded regulator valve such as a piston or diaphragm operated pressure control valve.

In the description of the flow diagram of FIG. 4 below, the method of using a negative rate limiter is disclosed whereby pilot fuel injection pressure, and gaseous fuel injection pressure, can be reduced by predetermined incremental steps, at a rate that is calibrated for an engine so that gaseous fuel pressure can be reduced without venting any of the gaseous fuel to atmosphere. With a control strategy that uses a constant value for the incremental steps dictated by the negative rate limiter, a magnitude for the steps is selected so that for all rates of fuel consumption, the gaseous fuel injection pressure can be reduced without venting any gaseous fuel. This means that the magnitude of the steps is governed by regions on the engine map where there is the lowest load and speed, and consequently, when the engine is operating in other regions of the engine map where the load and speed are higher, gaseous fuel pressure is not being decreased as quickly as possible. In preferred embodiments, as mentioned above, a more sophisticated method can be employed, with controller 350 determining the rate at which the gaseous fuel is being consumed, and adjusting the magnitude of the incremental steps that the controller commands, thereby increasing or decreasing the rate at which pilot and gaseous fuel injection pressures are changed, responsive to engine fuel consumption.

In the engine system illustrated by FIG. 3, there are two pressure sensors 316 and 326. However, because pilot fuel injection pressure is balanced with gaseous fuel injection pressure, only one pressure sensor is required for implementing the method and either one of the shown pressure sensors can be employed without the other. At least one pressure sensor is required because, when fuel injection pressure is commanded to decrease, with the disclosed method of restricting the rate at which fuel injection pressure can be decreased, actual fuel rail pressure can be higher than the target fuel injection pressure. Accordingly, one of pressure sensors 316 and 326 is required so that actual fuel rail pressure can be measured and controller 350 can adjust fuel injection pulsewidth so that the correct quantity of fuel is injected into the combustion chamber.

Fuel injection subsystem 340 comprises fuel injection valve 341, which is mounted in cylinder head 342. Fuel injection valve 341 comprises nozzle 343, which comprises a tip that is disposed within combustion chamber 344, through which gaseous fuel and pilot fuel can be directly injected into combustion chamber 344. In a preferred embodiment, fuel injection valve 341 comprises separate fuel passages and valve members for the gaseous fuel and the pilot fuel to allow separate and independent injection of the gaseous and pilot fuels. For example, co-owned U.S. Pat. No. 6,761,325, entitled, "Dual Fuel Injection Valve And Method of Operating A Dual Fuel Injection Valve", which is hereby incorporated by reference herein in its entirety, discloses a combined fuel injection valve assembly suitable for this application.

Combustion chamber 344 is defined by cylinder head 342, cylinder 345 and piston 346. Cylinder head 342 covers the top end of cylinder 345, opposite to piston 346, which is reciprocable within cylinder 345 to define the lower boundary of combustion chamber 344. Piston rod 348 connects piston 346 to crankshaft 348.

In addition to fuel rail pressure data received from at least one of pressure sensors 316 and 326, engine controller 350 can receive other data from internal combustion engine system 300, including some or all of the following: data relating to actual engine load, demanded engine load, engine speed, in-cylinder pressure, and fuel temperature fuel rail 317. Controller 350 is programmable to send command signals to pump 312, pilot fuel metering valve 322 and fuel injection valve 341, to make corrections to command signals based on the deviation of measured data from expected values.

In the illustrated examples shown in FIGS. 2 and 3, one or more intake valves are mounted in cylinder head 242, 342 and are operable to open and close to charge combustion chamber 244, 344 with air and recirculated exhaust gas from an intake manifold. One or more exhaust valves are mounted in cylinder head 242, 342 and are operable to open and close so that combustion products can be exhausted from combustion chamber 244, 344 to an exhaust manifold.

Figure 4:
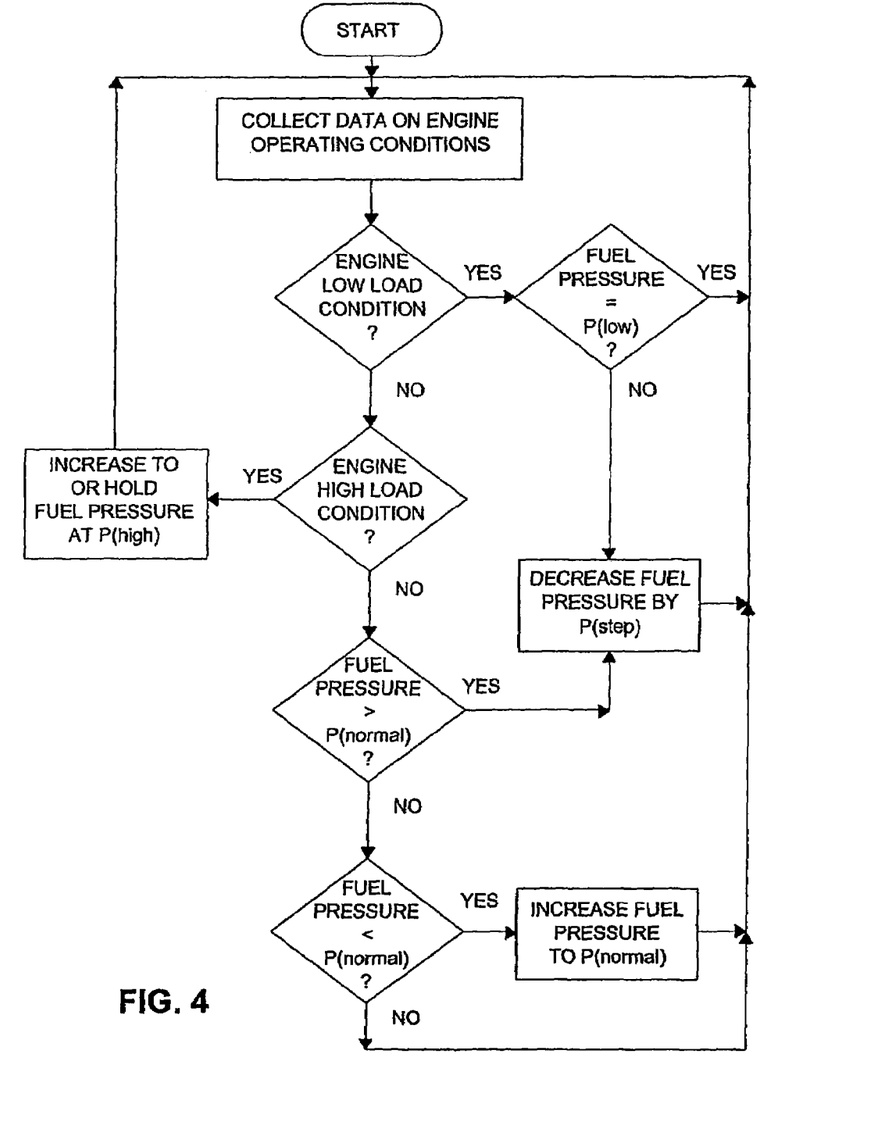
FIG. 4 is a flow diagram that illustrates, by way of example, the logic that can be employed for one method of controlling gaseous fuel pressure.
Figure 5:
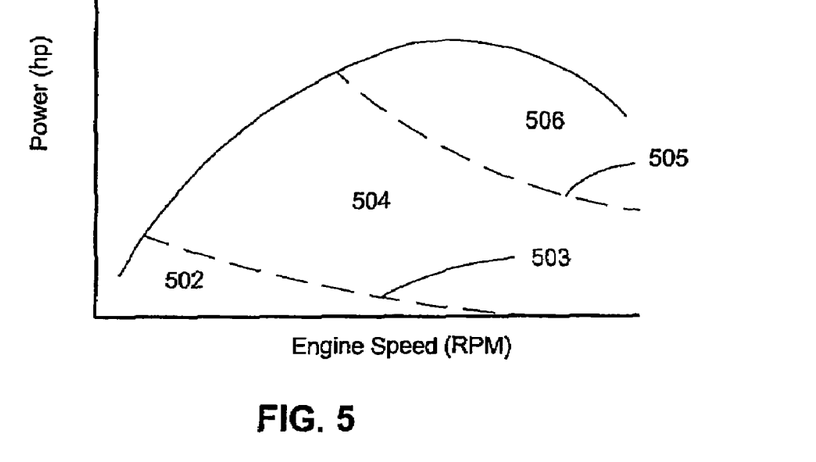
FIG. 5 is a plot of engine power (horsepower) versus engine speed (RPM), showing by way of example, a low load threshold and a high load threshold, defining regions on the engine map where gaseous fuel injection pressure can be commanded to a predetermined low, normal and high target pressures.

FIGS. 4 and 5 together illustrate a method of controlling gaseous fuel injection pressure using three discrete target injection pressures, each associated with a discrete region of an engine map.

FIG. 4 is a flow diagram that illustrates the control logic for increasing or decreasing gaseous fuel injection pressure, and using a negative rate limiter to restrict the rate at which gaseous fuel pressure is decreased so that gaseous fuel pressure can be reduced without venting gaseous fuel to atmosphere. The process starts by collecting data on engine operating conditions. Then the controller determines whether the engine is currently operating in a low load condition, a high load condition or an intermediate load condition, which is between the low and high load conditions.

If the controller detects a low load condition, the controller determines if fuel pressure is equal to pressure P(low). If yes, the control loop is completed and no adjustments to fuel injection pressure are needed. If fuel injection pressure is not equal to P(low), the controller commands the fuel delivery subsystem to decrease pressure by an incremental amount equal to P(step). P(step) is defined as the lesser of the difference between the measured injection pressure and the target injection pressure, and a predetermined increment, which is calibrated for the engine to allow gaseous fuel pressure to decay without venting.

If the controller detects a high load condition, the controller then commands the fuel delivery subsystem to increase fuel injection pressure to P(high), or if injection pressure is already at P(high), the controller simply commands the fuel delivery subsystem to maintain injection pressure at P(high).

If the controller detects neither a low load condition nor a high load condition, then the controller determines that an intermediate load condition exists, and the controller checks if fuel pressure is greater than the target normal pressure P(normal). If yes, then the controller commands the fuel delivery subsystem to decrease injection pressure by P(step). If fuel pressure is lower than normal pressure P(normal), then the controller commands the fuel delivery subsystem to increase injection pressure to P(normal).

A general characteristic of the disclosed method is that if injection pressure is commanded to increase, this can occur substantially instantaneously, by operation of a pressure regulator valve under the command of the controller, as long as there is a reserve of high pressure gaseous fuel upstream of the pressure regulator, stored, for example, in an accumulator vessel. However, if injection pressure is commanded to decrease, fuel pressure is allowed to decay at a rate that avoids venting of any high pressure gaseous fuel. As a result, the actual injection pressure during the decay period can be higher than the target injection pressure, requiring the controller to make adjustments to the fuel injection pulsewidth, to correct for the higher pressure.

As described above, a number of engine operating conditions can be referenced in the determination of the target fuel injection pressure from an engine map. In this example, as shown by FIG. 5, two of the engine operating conditions employed to determine the target injection pressure are engine power and engine speed. Instead of engine power, one could substitute another engine parameter such as torque and although the shape of the map might be different, the method can be applied using the same principles.

When the engine is idling or under low load conditions, less fuel is required and fuel pressure is decreased to allow an increase in fuel injection pulsewidth. As noted above with reference to FIG. 1, if fuel injection pulsewidth is too short, this can result in more variability in the actual amount of fuel that is injected from one injection event to the next, which can result in too much fuel being injected in one injection event and not enough or no fuel at all being injected in another injection event, with the consequence being unstable combustion. Predetermined target pressure P(low) is selected so that when the engine is idling, fuel injection pulsewidth can be longer than minimum pulsewidth PWmin, shown in FIG. 1. This method allows a gaseous-fuelled engine to achieve stable combustion at idle or low load conditions, such as when a vehicle is at rest or descending down a hill.

Some engines can be operated with the engine map divided into just two load regions with the low load threshold providing the boundary between the two regions. For such engines, a predetermined target pressure P(normal) provides a desirable injection pressure for all of the operating points on the engine map above the low load threshold. That is, under high load and high speed conditions, when more fuel is demanded, at injection pressure P(normal) the desired quantity of fuel can be injected with a fuel injection pulsewidth that is not too long. For example, a pulsewidth that is too long can result in too much of the fuel being injected later during the power stroke where its combustion contributes less to the power and torque produced by the engine, and where more of the fuel might be left unburned, lowering the efficiency of the engine. At the other end of the range, where the engine is operating at a point on the engine map near the low load threshold, and where less fuel is required, it is important that injection pressure P(normal) not be so high as to reduce the fuel injection pulsewidth below minimum pulsewidth PWmin.

If it is difficult to select a second discrete fuel injection pressure, P(normal), that is suitable for all engine operating points above the low load threshold, more target fuel injection pressures can be specified and associated with different operating regions defined by additional thresholds. The number of thresholds and target fuel injection pressures is a function of the engine's operating characteristics such as the operating ranges for load and speed. The benefit of changing fuel injection pressure for different operating points on the engine map is more important for gaseous fuels compared to liquid fuels because gaseous fuels have a much lower mass density compared to liquid fuels.

At an operating point near the high load end of a region, if the pressure that is required to inject the desired amount of fuel with a pulsewidth that results in efficient combustion and the desired power and torque outputs, is an unsuitable pressure at the lower end of the region near the low load threshold, resulting in a pulsewidth below minimum pulsewidth PWmin, then a second threshold and another target injection pressure should be employed. In the illustrated example of FIGS. 4 and 5, a third predetermined target injection pressure P(high) is specified, and is associated with high load region 506 defined by high load threshold 505. It will be understood that by applying the principles disclosed herein, the number of defined operating regions and associated discrete target injection pressures can be determined for the particular characteristics of a specific engine.

Test data collected from a Cummins ISX 450 hp engine equipped with the disclosed gaseous and pilot fuel delivery subsystems, and operating according to the disclosed method has shown that stable combustion was difficult to achieve with a constant fuel injection pressure. When the disclosed method and apparatus was applied to this engine, stable combustion was achieved with the engine's power, performance and energy efficiency substantially matching that of a conventional diesel engine, but with lower emissions of NOx and particulate matter. Test data has been collected from engines of this type that were installed in test cells and in test vehicles that have been driven on-road. For this engine it was possible to use just two discrete target injection pressures, selected on the basis of a detected engine state. For example, when the engine state was idle or a power take off state, when only auxiliary loads were applied, then the controller commanded a lower target injection pressure, than the normal target injection pressure that the controller commanded when the engine was subjected to loads associated with the engine's function as the prime mover, to move the vehicle, and for a cranking state, when the engine is starting up. For this engine, a normal target injection pressure could be found that was suitable over a broad range of engine operating points, allowing a two-target fuel injection pressure control strategy.

While data taken from actual engine tests show that it is possible to run an engine with as few as two discrete target injection pressures, with a gaseous-fuelled engine there are a number of factors in addition to the lower density of gaseous fuels that might make it desirable to specify three or more operating regions.

With a gaseous-fuelled direct injection engine of the type disclosed herein, gaseous fuel is injected directly into the combustion chamber, but injection pressure is lower than the fuel injection pressures used by conventional diesel engines, which require extra energy to atomize the fuel. Therefore, a factor can be that, in the high load operating range, higher peak in-cylinder pressures can influence the engine performance if gaseous fuel injection pressure is not raised to maintain a ratio between fuel injection pressure and in-cylinder pressure to result in at least some of the gaseous fuel in the fuel jet exceeding sonic velocity.

Another factor is that because gaseous fuels are generally cleaner burning compared to conventional diesel fuels, higher proportions of exhaust gas recirculation can be employed because there is less particulate matter in the engine exhaust gas. Higher exhaust gas recirculation rates can help to further reduce production of NOx, but a side effect is that this also slows the combustion rate. Accordingly, for gaseous-fuelled engines that take advantage of the benefit of using higher exhaust gas recirculation rates, at high load high speed conditions, where, compared to other operating points a larger amount of fuel is demanded, it can be desirable to increase fuel injection pressure to accelerate the combustion rate to offset the opposite effect caused by high levels of exhaust gas recirculation.

FIG. 5 has already been mentioned in above in relation to FIG. 4. FIG. 5 shows a graph that plots engine power against engine speed. The normal operating conditions for the engine are bounded by the maximum rated power and the maximum rated speed and the operating conditions within these boundaries are divided in low load region 502, intermediate load region 504 and high load region 506. Line 503, defined herein as the low load threshold, separates low load region 502 from the intermediate load region 504. Line 505, defined herein as the high load threshold, separates high load region 506 from intermediate load region 504.

Figure 6:
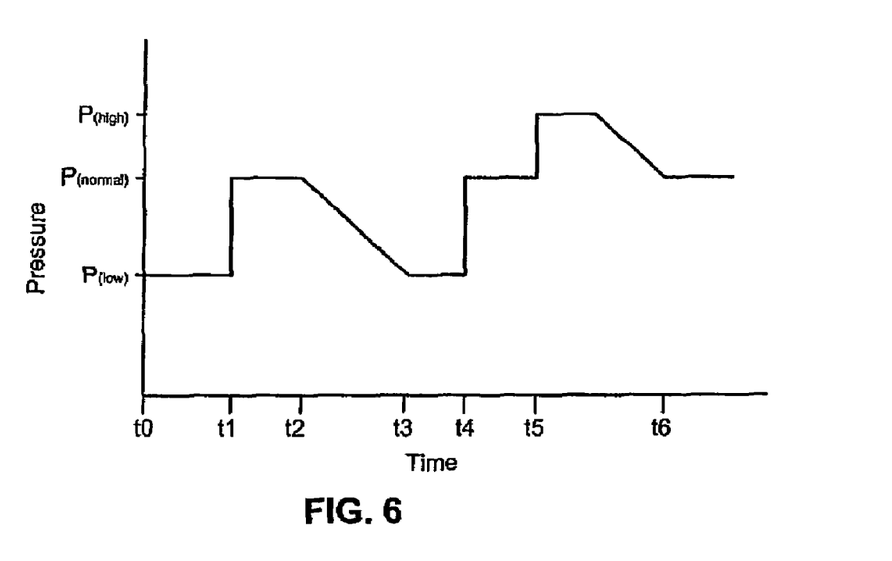
FIG. 6 is a plot of fuel injection pressure against time, showing by way of example the effect of the disclosed method as an engine is commanded to different operating conditions.

With reference to FIG. 6, gaseous fuel injection pressure is plotted against time to illustrate the effect of the disclosed method on gaseous fuel pressure as an engine is commanded to different operating conditions. At t0 the engine is idling and gaseous fuel pressure is held at P(low). At t1, a load is applied and the engine controller detects that the engine is no longer idling whereupon the engine controller commands an increase in gaseous fuel pressure to P(normal). At t2 the engine returns to idling, and again the engine controller detects a change in engine operating conditions. The negative rate limiter controls the decrease in gaseous fuel pressure by commanding a series of incremental pressure reductions, until gaseous fuel pressure is reduced to P(low), or until the controller detects that the engine is no longer idling. At t3, a load is again applied causing an increase in gaseous fuel pressure to P(normal). At t4, a high load is applied to the engine, for example, when a vehicle is ascending a steep incline. The engine controller detects that the engine is operating at a point on the engine map above a predefined high load threshold and gaseous fuel pressure is commanded to be increased to P(high). At t5, the load drops below the high load threshold and this is detected by the engine controller, whereupon it commands gaseous fuel pressure to be reduced to P(normal), and the negative rate limiter governs the rate at which the pressure is reduced to prevent venting of gaseous fuel. At t6, the engine controller detects that gaseous fuel pressure is at P(normal), and that engine is still under load, but below the high load threshold, so gaseous fuel pressure is maintained at P(normal).

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. An operating method for an internal combustion engine, said operating method comprising:
   delivering a gaseous fuel to a fuel injection valve, wherein gaseous fuel pressure within said fuel injection valve is defined as gaseous fuel injection pressure;
   during an engine's compression stroke, injecting said gaseous fuel directly into a combustion chamber through said fuel injection valve;
   determining a value for at least one pre-selected engine parameter from engine operating conditions and commanding gaseous fuel injection pressure to a predetermined target value that is associated with said determined value of said at least one pre-selected engine parameter; and
   measuring gaseous fuel injection pressure and adjusting fuel injection pulsewidth to correct for differences between said predetermined target values and measured gaseous fuel injection pressure to thereby inject a desired mass quantity of gaseous fuel as determined from an engine map.

2. The operating method of claim 1 wherein at least one of said preselected engine parameters is engine state, engine load, engine speed, fuel rail temperature, or in-cylinder pressure.

3. The operating method of claim 1 further comprising maintaining a ratio of gaseous fuel injection pressure to in-cylinder pressure that is high enough to result in a fuel jet exiting from said fuel injection valve comprising at least some gaseous fuel with a velocity exceeding sonic velocity within said combustion chamber.

4. The operating method of claim 1 further comprising commanding gaseous fuel injection pressure to predetermined target pressures for predetermined operating points on said engine map, and calculating target pressures for operating points between said predetermined operating points by interpolation.

5. The operating method of claim 1 further comprising defining said fuel injection pulsewidth for predetermined operating points on said engine map, and calculating fuel injection pulsewidth for operating points between said predetermined operating points by interpolation.

6. The operating method of claim 1 further comprising maintaining said fuel injection pulsewidth so that it is no less than a predetermined minimum pulsewidth.

7. The operating method of claim 6 further comprising decreasing gaseous fuel injection pressure to lengthen fuel injection pulsewidth.

8. The operating method of claim 1 further comprising injecting a pilot fuel into said combustion chamber to trigger ignition of said gaseous fuel.

9. The operating method of claim 8 wherein said fuel injection valve is operable to introduce both said pilot fuel and said gaseous fuel into said combustion chamber.

10. The operating method of claim 9 further comprising regulating gaseous fuel pressure and pilot fuel pressure to reduce a pressure differential between said gaseous fuel and said pilot fuel before each of said fuels is delivered to said fuel injection valve.

11. The operating method of claim 10 wherein gaseous fuel pressure is negatively biased with respect to pilot fuel pressure.

12. The operating method of claim 1 wherein when gaseous fuel injection pressure is commanded to decrease, gaseous fuel injection pressure is decreased without venting said gaseous fuel to atmosphere.

13. The operating method of claim 12 wherein said method further comprises decreasing gaseous fuel injection pressure using a negative rate limiter.

14. The operating method of claim 13 wherein said negative rate limiter is operative using closed loop control to decrease gaseous fuel injection pressure by predetermined increments until a target pressure is attained.

15. The operating method of claim 13 wherein said negative rate limiter comprises a negative rate limiting algorithm programmable into an electronic engine controller.

16. The operating method of claim 13 wherein said negative rate limiter comprises an electronic circuit.

17. The operating method of claim 12 wherein gaseous fuel injection pressure is decreased at a rate that is a function of said engine's gaseous fuel consumption rate.

18. The operating method of claim 17 wherein decreasing gaseous fuel injection pressure further comprises stopping delivery of said gaseous fuel to a fuel rail that feeds said fuel injection valve until gaseous fuel injection pressure drops to a desired one of said predetermined values.

19. The operating method of claim 18 wherein said method further comprises closing a valve associated with a fuel supply line to stop delivery of said gaseous fuel to said fuel injection valve.

20. The operating method of claim 18 wherein said method further comprises shutting down a compressor or pump that is employed to supply said gaseous fuel to said fuel injection valve to stop delivery of said gaseous fuel to said fuel injection valve.

21. The operating method of claim 1 wherein said method further comprises commanding said gaseous fuel injection pressure to one of a plurality of discrete predefined pressures responsive to measured engine parameter values, said engine parameters comprising at least one of engine state, engine load, engine speed, fuel rail temperature, and in-cylinder pressure.

22. The operating method of claim 21 wherein one of said plurality of discrete predefined pressures is P(low) which is lower than a second predefined injection pressure P(normal) and said method further comprises commanding gaseous fuel injection pressure to P(low) when said engine is operating in an idling condition, and commanding said gaseous fuel injection pressure to P(normal) when a load is applied to said engine.

23. The operating method of claim 22 further comprising a third predefined injection pressure P(high), which is higher than P(normal), and said method further comprises commanding gaseous fuel injection pressure to P(high) when said engine is operating at a point on said engine map above a predetermined high load threshold.

24. The operating method of claim 22 wherein said pressure P(low) is a pressure at which a desired amount of gaseous fuel can be injected into said combustion chamber through said fuel injection valve with a fuel injection pulsewidth greater than or equal to a predetermined minimum pulsewidth when said engine is operating in an idling condition.

25. The operating method of claim 22 wherein one of said predefined injection pressures is P(low) which is lower than a second predefined injection pressure P(normal) and said method further comprises commanding gaseous fuel injection pressure to P(lo w) when said engine is operating at a point on said engine map that is below a predefined low load threshold, and commanding said gaseous fuel injection pressure to P(normal) when said engine is commanded to an operating point above said low load threshold.

26. The operating method of claim 25 wherein said pressure P(low) is a pressure at which a desired amount of gaseous fuel can be injected into said combustion chamber through said fuel injection valve with said fuel injection pulsewidth being greater than or equal to a predetermined minimum pulsewidth when said engine is operating in an idling condition.

27. The operating method of claim 25 further comprising a third predefined injection pressure P(high), which is higher than P(normal), and said method further comprises commanding gaseous fuel injection pressure to P(high) when said engine is operating at a point on said engine map above a predetermined high load threshold.

28. The operating method of claim 27 further comprising re-circulating a portion of exhaust gases from one engine cycle to return to said combustion chamber for a subsequent engine cycle.

29. The operating method of claim 27 wherein when said engine is operating at a point on said engine map above said predetermined high load threshold, recirculated exhaust gas makes up at least 15% by mass of the gases introduced into said combustion chamber during an intake stroke.

30. An internal combustion engine system comprising components that cooperate with each other to introduce a gaseous fuel into a combustion chamber where it can be combusted, said internal combustion engine system comprising:
(a) a fuel delivery subsystem comprising a device for controlling gaseous fuel pressure and a fuel rail for delivering said gaseous fuel;
(b) a fuel injection valve operatively connected to said fuel rail whereby said gaseous fuel at a commanded gaseous fuel injection pressure can be directed from said fuel supply subsystem to said fuel injection valve, and introduced into said combustion chamber through a fuel injection valve nozzle that is disposed in said combustion chamber;
(c) a controller operative to:
 (i) determine a value for at least one pre-selected engine parameter from engine operating conditions;
 (ii) determine a target value for gaseous fuel injection pressure that is associated with said determined value of said at least one pre-selected engine parameter;
 (iii) command said device for controlling gaseous fuel injection pressure to increase, or decrease gaseous fuel pressure to said target value if gaseous fuel injection pressure is not equal to said target value; and
 (iv) command opening and closing of said fuel injection valve to adjust fuel injection pulsewidth to correct for differences between measured gaseous fuel injection pressure and said target value.

31. The internal combustion engine system of claim 30 wherein one of said pre-selected engine parameters is in-cylinder pressure, and said target value is selected to maintain a ratio of gaseous fuel injection pressure to in-cylinder pressure that is high enough to result in a fuel jet exiting from said fuel injection valve comprising at least some gaseous fuel with a velocity exceeding sonic velocity within said combustion chamber.

32. The internal combustion engine system of claim 30 wherein said fuel delivery subsystem further comprises a pump or compressor that can be employed for delivering high pressure gaseous fuel to said fuel injection valves, and wherein said controller can be programmed to command said pump or compressor to stop to allow gaseous fuel injection pressure to decrease as gaseous fuel within said fuel rail between said pump or compressor and said fuel injection valve is consumed by said engine.

33. The internal combustion engine system of claim 30 further comprising an exhaust gas recirculation apparatus for directing an exhaust gas stream, which originates from said combustion chamber, back into said combustion chamber, and an EGR valve for regulating the amount of exhaust gas that is recirculated.

34. The internal combustion engine system of claim 30 further comprising a sensor associated with said fuel injection valve or said fuel rail between said device for controlling gaseous fuel pressure and said fuel injection valve, for measuring gaseous fuel pressure.

35. The internal combustion engine system of claim 30 further comprising a sensor for measuring in-cylinder pressure directly or for measuring an operating parameter associated with said engine from which in-cylinder pressure can be determined indirectly.

36. The internal combustion engine system of claim 30 wherein said device for controlling gaseous fuel pressure is a pressure regulating valve associated with said fuel rail.

37. The internal combustion engine system of claim 36 wherein said controller can command said pressure regulating valve to close to allow gaseous fuel injection pressure to decrease as gaseous fuel within said fuel rail between said pressure regulating valve and said fuel injection valve is consumed by said engine.

38. The internal combustion engine system of claim 30 wherein said pre-selected engine parameter(s) define an engine map and a low load threshold divides regions of said engine map, whereby:
(a) when said engine is operating at a point on said engine map that is below said low load threshold, said controller is operative to command gaseous fuel injection pressure to a predefined pressure P(low); and
(b) when said engine is operating at a point on said engine map that is above said low load threshold, said controller is operative to command gaseous fuel injection pressure to a predefined pressure P(normal), wherein P(normal) is greater than P(low).

39. The internal combustion engine system of claim 38 further comprising a high load threshold whereby said engine map is divided into three regions, and when said engine is operating at a point on said engine map that is above said high load threshold, said controller is operative to command gaseous fuel injection pressure to a predefined pressure P(high), wherein P(high) is greater than P(normal).

40. The internal combustion engine system of claim 30 further comprising a negative rate limiter associated with said device for controlling gaseous fuel pressure, said negative rate limiter restricting decreases in gaseous fuel pressure to prevent venting of said gaseous fuel to atmosphere.

41. The internal combustion engine system of claim 40 wherein said controller is an electronic controller.

42. The internal combustion engine system of claim 41 wherein said negative rate limiter comprises a dedicated electronic circuit.

43. The internal combustion engine system of claim 41 wherein said negative rate limiter comprises a negative rate limiting algorithm programmed into said electronic controller.

44. The internal combustion engine system of claim 30 wherein said fuel injection valve is integrated with a pilot fuel injection valve whereby pilot fuel and said gaseous fuel can each be introduced into said combustion chamber through a single fuel injection valve assembly.

45. The internal combustion engine system of claim 44 wherein for said gaseous fuel and said pilot fuel, said single fuel injection valve assembly comprises separate fuel passages and separate valve members, allowing separate and independent injection into said combustion chamber of said gaseous fuel and said pilot fuel.

46. The internal combustion engine system of claim 45 wherein said device for controlling gaseous fuel pressure is also operative to maintain a pressure differential between said gaseous fuel and said pilot fuel within a predetermined range.

47. The internal combustion engine system of claim 46 wherein said gaseous fuel injection pressure is negatively biased with respect to pilot fuel injection pressure.

48. The internal combustion engine system of claim 46 wherein said device for controlling gaseous fuel pressure comprises a dome-loaded regulator that is in communication with a pilot fuel rail.

* * * * *